United States Patent [19]

Mann, Jr.

[11] 3,785,796

[45] Jan. 15, 1974

[54] PRODUCTION OF UREA-AMMONIUM SULFATE

[75] Inventor: Horace C. Mann, Jr., Florence, Ala.

[73] Assignee: Tennessee Valley Authority, Muscle Shoals, Ala.

[22] Filed: Jan. 27, 1972

[21] Appl. No.: 221,262

Related U.S. Application Data

[63] Continuation of Ser. No. 155,133, June 21, 1971.

[52] U.S. Cl. .......................... 71/28, 71/61, 71/63, 71/64 DA
[51] Int. Cl. .............................................. C05c 9/00
[58] Field of Search ..................... 71/28, 30, 61, 63, 71/64 DA, 64 E, 64 F

[56] References Cited

UNITED STATES PATENTS

| | | | |
|---|---|---|---|
| 3,165,395 | 1/1965 | McCamy et al. | 71/64 DA X |
| 3,635,691 | 1/1972 | Earl | 71/64 DB X |
| 3,408,169 | 10/1968 | Thompson et al. | 71/28 X |
| 3,353,949 | 11/1967 | Nau | 71/1 X |
| 3,030,657 | 4/1962 | von Reppert | 71/64 DA X |
| 3,050,772 | 8/1962 | von Reppert | 71/64 DA X |
| 3,110,572 | 11/1963 | Von Reppert | 71/64 DA X |

FOREIGN PATENTS OR APPLICATIONS

| | | | |
|---|---|---|---|
| 1,112,091 | 8/1961 | Germany | 71/30 |
| 589,087 | 2/1959 | Italy | |

Primary Examiner—Frank A. Spear, Jr.
Assistant Examiner—Richard Barnes
Attorney—Robert A. Petrusek

[57] ABSTRACT

A process for the production of urea-ammonium sulfate granules from urea and ammonium sulfate by several granulation methods. The proportion of ammonium sulfate in the mixture was varied from 15 percent to 70 percent by weight resulting in products containing from 42 percent to 29 percent N and 3 percent to 17 percent S, respectively. Unexpectedly, the urea-ammonium sulfate mixture in these proportions were fluid enough at 250° F. to 325° F. to be prilled and granulated. The presence of the ammonium sulfate increased the strength of the granules significantly.

1 Claim, 3 Drawing Figures

FLOW DIAGRAM OF GRANULATION PILOT PLANT FOR PRODUCTION
OF UREA-AMMONIUM SULFATE

PRILLING RANGES OF UREA-AMMONIUM SULFATE MIXTURES

PRILLING UREA-AMMONIUM SULFATE IN LIQUID MEDIUM

FLOW DIAGRAM OF GRANULATION PILOT PLANT FOR PRODUCTION OF UREA-AMMONIUM SULFATE

PRODUCTION OF UREA-AMMONIUM SULFATE

This application is a continuation of my copending application Ser. No. 155,133, filed June 21, 1971, for Production of Urea-Ammonium Sulfate.

The invention herein described may be manufactured and used by or for the Government for governmental purposes without the payment to me of any royalty therefor.

My invention relates to a newly developed process for the production of granular urea - ammonium sulfate; more particularly to the granulation of a mixture of ammonium sulfate and urea; and still more particularly to the production of granular urea-ammonium sulfate wherein the resulting product is in a highly crystallized form of desired and predetermined particle size analyzing high in nitrogen fertilizer values and containing also therein sulfur values available to the growing plant, which material is useful in liquid and suspension fertilizer preparations, bulk blending, and for direct application, and which material provides an economically attractive outlet for the over-abundant ammonium sulfate production capacity prevalent in the industry.

Most of the ammonium sulfate produced in this country is byproduct material from the plastics or steel industries. Until recently up to about one and a half million tons of this byproduct has been exported. Recently, however, the export market for this material has dropped by approximately one-third. Present indications are that total exports of ammonium sulfate will probably decrease further, thus leaving producers of this material with large excesses for use in some alternate product lines or for disposal at some alternate lower pricing schedule. To compound the problem, investigations into the possibilities of alternate routes to purification of power plant stack gases indicate that possibly one of the most relatively economical routes will result in the further production of large amounts of ammonium sulfate liquor. This byproduct, ammonium sulfate, has two drawbacks: (1) its low analysis of plant food values and (2) up to now its particle size when processed into the solid form has been quite variable and oftentimes much too small for satisfactory use in fertilizer bulk blending operations.

One possibility for enhancing the particle size characteristics of solid ammonium sulfate and at the same time producing a granular high-analysis nitrogen fertilizer containing, in addition to nitrogen values, some sulfur, is by combining such ammonium sulfate with molten urea or any other suitable molten carrier and prilling the resultant mixture. In the case where the molten urea is of a concentration of about 99 to about 99.8 percent, such a process would require no drying step. Although specific details as to the granulation of the mixture of ammonium sulfate and molten urea may be varied as indicated infra, one embodiment thereof generally follows a procedure somewhat similar to that shown in Bottai et al, U. S. Pat. 3,578,433, issued May 11, 1971, assigned to the assignee of the present invention. As shown in Bottai et al, the prilling is accomplished in liquid medium usually an oil of petroleum source, which procedure eliminates the necessity for large capital investment for high vertical prilling towers and the like. The prilling in liquid medium does, however, necessitate a liquid medium recovery step for recycle to the process, which liquid medium recovery step normally entails the use of a centifuge separator mechanism.

Oil prilling or liquid medium prilling of urea, of course, is not new per se, as is evidenced by U. S. Letters Pat. No. 1,951,518, Mar. 20, 1934, Meiser. In fact, Meiser teaches in addition to the oil prilling of urea the addition of various substances to urea melts to allegedly reduce the solidification point of what he terms the anhydrous melt, preferably to about 250° F. Meiser includes in his list of additives ammonium sulfate and teaches that no more than 15 percent of this addition product should or can be added to the urea and that preferably 5 to 10 percent of the addition material is sufficient to accomplish the observed reduction in melting point.

As indicated above, the preferred embodiment of my process is somewhat similar, at least in relation to some of the equipment employed, to the teaching of Bottai et al '433, supra. Another teaching along the lines of Bottai et al is found in application Ser. No. 67,878, filed Aug. 28, 1970, Jordan, assigned to the assignee of the present invention. As to the other methods of preparing urea - ammonium sulfate mixtures, see Italian Pat. No. 589,087, Feb. 25, 1959.

In another embodiment of my invention, ammonium sulfate and molten urea is granulated by introducing the mixture onto a bed of fast-moving cascading particles of undersize and recycled urea - ammonium sulfate contained on the plate surface of an inclined rotating pan-type granulator. Any suitable pan granulator may be utilized, preferably the pan is inclined about 60° horizontally and rotating somewhere around 20–40 r.p.m., depending on the diameter of the pan, it being important only that the pan impart the proper particle action to the bed thereon so that a portion thereof is slow moving as it begins to climb the face of the pan and cascading or fast moving in the general region where the pan plate begins to change from an upward to a downward movement so that to provide for the particles to water fall or cascade away from the rim of the pan into a fan-like or spiraling path inwardly generally toward the center of the pan, and with sufficient centri-fugal force provided therein to insure that the falling or cascading particles never approach said center of the pan but do fall away from the rim thereof. This cascading action and spraying of molten material onto that fast-moving portion of the pan has been described, for example, in U. S. Pat. No. 3,165,395, McCamy et al. In still another embodiment of my invention, I find that I can utilize the TVA drum ammoniator-granulator to accomplish granulation of the urea - ammonium sulfate mixture, which drum-granulator is shown in U. S. Pat. No. 2,741,545, Nielsson, assigned to the assignee of the present invention.

In developing my process I was, of course, aware that urea solutions of about 99.5 percent concentration are produced at a temperature of about 300° F. and also that solid urea is melted in commerical equipment at about this same temperature. However, ammonium sulfate has a relatively high melting temperature, i.e., about 625° F. I therefore originally expected that mixtures of urea and ammonium sulfate would have to be heated to some temperature intermediate 300° and 600° F. to obtain mixtures of the two materials sufficiently fluid to use in the droplet-forming device of the liquid medium prilling scheme, and that the intermediate temperature required would depend perhaps mostly upon the proportions of the materials present in the mixtures. However, on searching the literature, it became obvious from an article in the Russian Journal of Applied Chemistry, vol. 40, 9, p. 1989 (1967) and from the work done by Meiser, supra, that ammonium sulfate was slightly soluble in urea. The Russian article stated that a eutectic point existed at 121.5° C. and at this temperature, a mixture of 9 percent ammonium sulfate and 91 percent urea was liquid. Work currently done at TVA confirms the Russian data that a eutectic point indeed exists at about this composition and temperature wherein the mixture is completely liquid. This TVA data, plus other TVA data at both higher and lower proportions of urea is shown in the tabulation below. The data at higher proportions of ammonium sulfate shows that as the proportion of ammonium sulfate increases, the amount that does not melt also increases. Therefore, it might be expected that the urea - ammonium sulfate mixture would not be fluid when solids were present.

| Percent urea | Percent ammonium sulfate | Percent liquid at 275° F. | Percent of input ammonium sulfate that does not melt at 275° F. |
|---|---|---|---|
| 100 | 0 | 100 | — |
| 95 | 5 | 100 | 0 |
| 90 | 10 | 100 | 0 |
| 85 | 15 | 95 | 33 |
| 80 | 20 | 91 | 45 |
| 60 | 40 | 67 | 82 |
| 50 | 50 | 58 | 84 |
| 40 | 60 | 44 | 93 |
| 30 | 70 | 33 | 96 |
| 10 | 90 | 16 | 93 |

Also, Meiser points out in his patent that up to 15 percent (but generally 5–10 percent is sufficient) of an addition compound such as ammonium sulfate will depress the solidification point of the anhydrous melt. However, Meiser definitely pointed out that no more than a maximum 15 percent of an addition compound should be used. The reason for this 15 percent maximum value was not explained. Evidently, Meiser found that the presence of solids in his melt, when more than about 10 percent ammonium sulfate was present, prevented his utilization of the resultant mixture. Contrary to the teachings of Meiser, I have found that I can handle or distribute a slurry containing undissolved particles of ammonium sulfate as long as there is sufficient liquid phase, provided primarily by the molten urea, to have a handleable fluid. Thus, although the teachings of Meiser would have led me to believe that I could not handle or granulate a slurry containing more than 15 percent ammonium sulfate in molten urea, I have observed to the contrary that I can incorporate as much as about 70 percent ammonium sulfate in the urea melt and still produce a granular product by prilling. The granular product is a matrix of the solidified urea wherein is embedded the particles of solid ammonium sulfate. My batch tests made on the laboratory scale showed quite unexpectedly that a mixture containing up to about 70 percent ammonium sulfate in urea was a fluid slurry in the temperature range of 275° to 300° F., which is the same temperature range in which urea is normally held as a melt to be prilled. I also found that when more than about 70 percent of the ammonium sulfate was present, the mixture became too viscous and foamy to flow, even when the temperature was increased above 325°F.

I have found also that when urea and ammonium sulfate are combined in the manner indicated, the resulting prills were found to be much stronger than were prills made from 100 percent urea. This increase in strength of the ammonium sulfate prills over the strength of 100 percent urea prills is illustrated in Table I below.

It is therefore an object of the present invention to produce well defined prills or granules of urea ammonium sulfate having strength and crushing characteristics greater than straight urea prills alone and which therefore have excellent handling and storage properties.

Another object of the present invention is to produce well-defined prills or granules of urea - ammonium sulfate having strength and crushing characteristics

TABLE I

Strength of Oil-Prilled Urea — Ammonium Sulfate

| | % Ammonium sulfate in prills | Prill strength[2] | | | |
|---|---|---|---|---|---|
| | | As prilled | After | | |
| Grade[1] | | | 1 week | 1 month | 6–8 weeks |
| 46-0-0 | 0 | 1.5–2 | 2.5 | 2.5 | 2.5 |
| 46-0-0-0.25 | 1–2 | 2 | 2.5 | 2.5 | 2.5 |
| 45-0-0-0.95 | 4–6 | 2.5–3 | 3–3.5 | 3 | 3 |
| 43-0-0-2.5 | 9–11 | 3–4 | 3–3.5 | 3–3.5 | 3–3.5 |
| 41-0-0-4.5 | 18–19 | 4 | 4 | 3.5–4 | 3.5–4 |
| 35-0-0-10.5 | 41–46 | 3.5–4 | 3.5–4 | 3.5 | 3.5 |
| 31-0-0-14.5 | 58–64 | 3.5 | 3.5 | 3.5 | — |

[1] Anhydrous and oil free
[2] Force in pounds to crush −7 +8 mesh prills greater than straight urea prills alone, which therefore have excellent handling and storage properties, and which contain upwards to as great as 70 percent by weight thereof of ammonium sulfate and preferably from about 20 to 60 weight percent as ammonium sulfate.

Still another object of the present invention is to produce well-defined prills of urea - ammonium sulfate having strength and crushing characteristics greater than straight urea prills alone, which therefore have excellent handling and storage properties, which contain upwards to as great as 70 percent by weight thereof of ammonium sulfate, and preferably from about 20 to 60 weight percent as ammonium sulfate, and which prills are produced by introducing a mixture of molten urea, said urea containing at least about 99 percent urea by weight and solid particulate ammonium sulfate into droplet-forming means wherefrom the droplets produced therein comprising a matrix of molten urea and a mixture of molten and solid ammonium sulfate are quenched, solidifed, and cooled by introduction into either a liquid medium immiscible with said droplets, a pan granulator, or a rotary drum type granulator.

Still further and more general objects and advantages of the present invention will appear from the more detailed description set forth below, it being understood, however, that this more detailed description is given by way of illustration and explanation only and not by way of limitation since various changes therein may be made by those skilled in the art without departing from the spirit and scope of the present invention.

My invention, together with further objects and advantages thereof will be better understood from a consideration of the following description taken in connection with the accompanying drawings in which:

FIG. 1 depicts graphically the operable and preferred ranges of prilling mixtures of urea - ammonium sulfate in liquid medium according to the dictates of my invention. It is understood that the liquid medium can be most any liquid which is immiscible with the mixture of urea and ammonium sulfate and which has the usual desired characteristics for liquid medium quenching, i.e., low volatility, ease of separation from the prills, etc. I have found that a number of liquids can be used, principally oils of hydrocarbon origin and any of the materials specified by Bottai et al, supra. It should also be noted, as pointed out infra, that my invention and the process thereof is not restricted to liquid medium prilling, albeit this route has been the one I have found the most easy to follow. As noted infra, for existing urea production facilities, including already existing prilling towers, my mixture of molten urea and molten and solid particulate ammonium sulfate can easily be adapted to be used therein.

Figure 1:
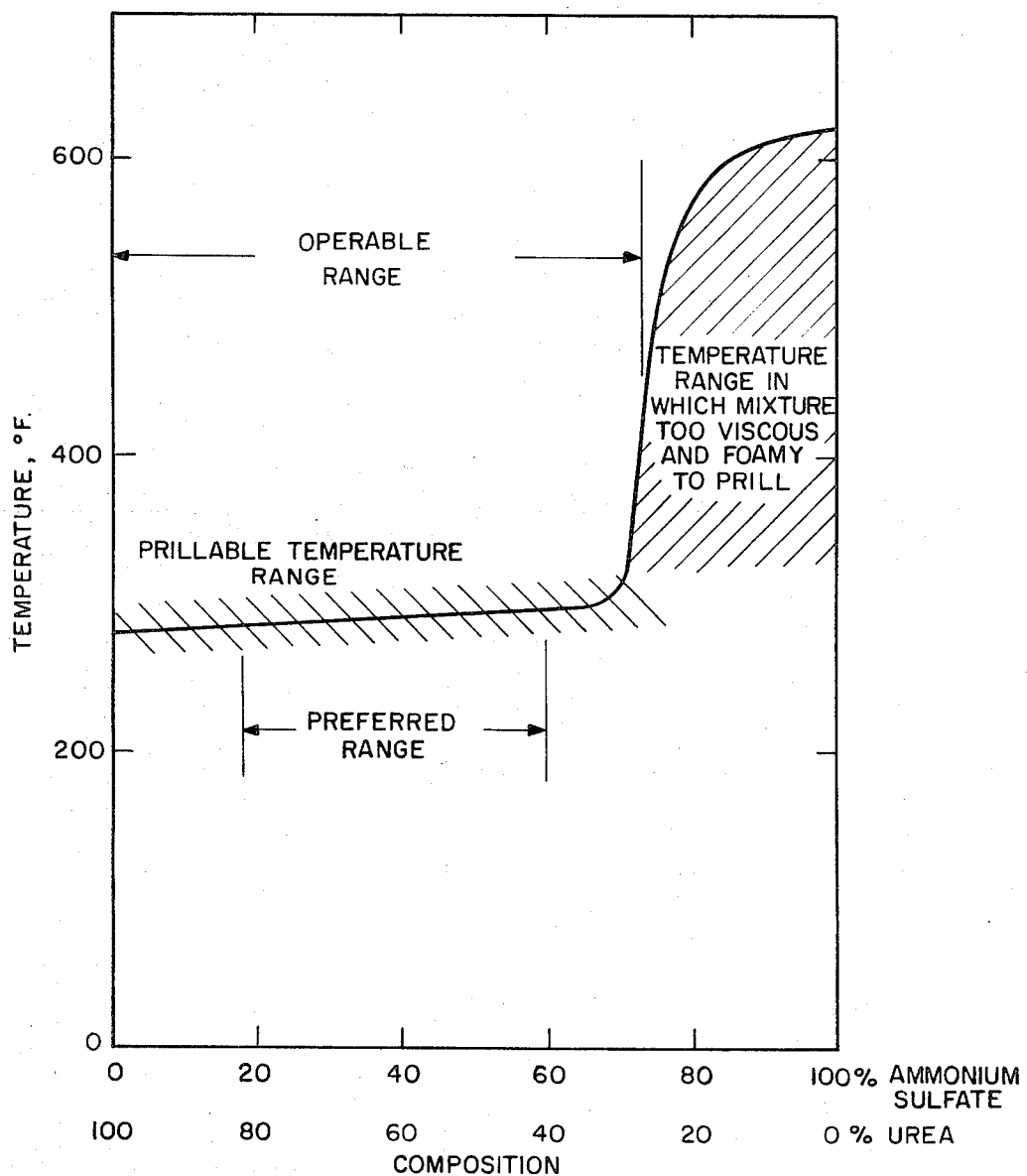
Figure 2:
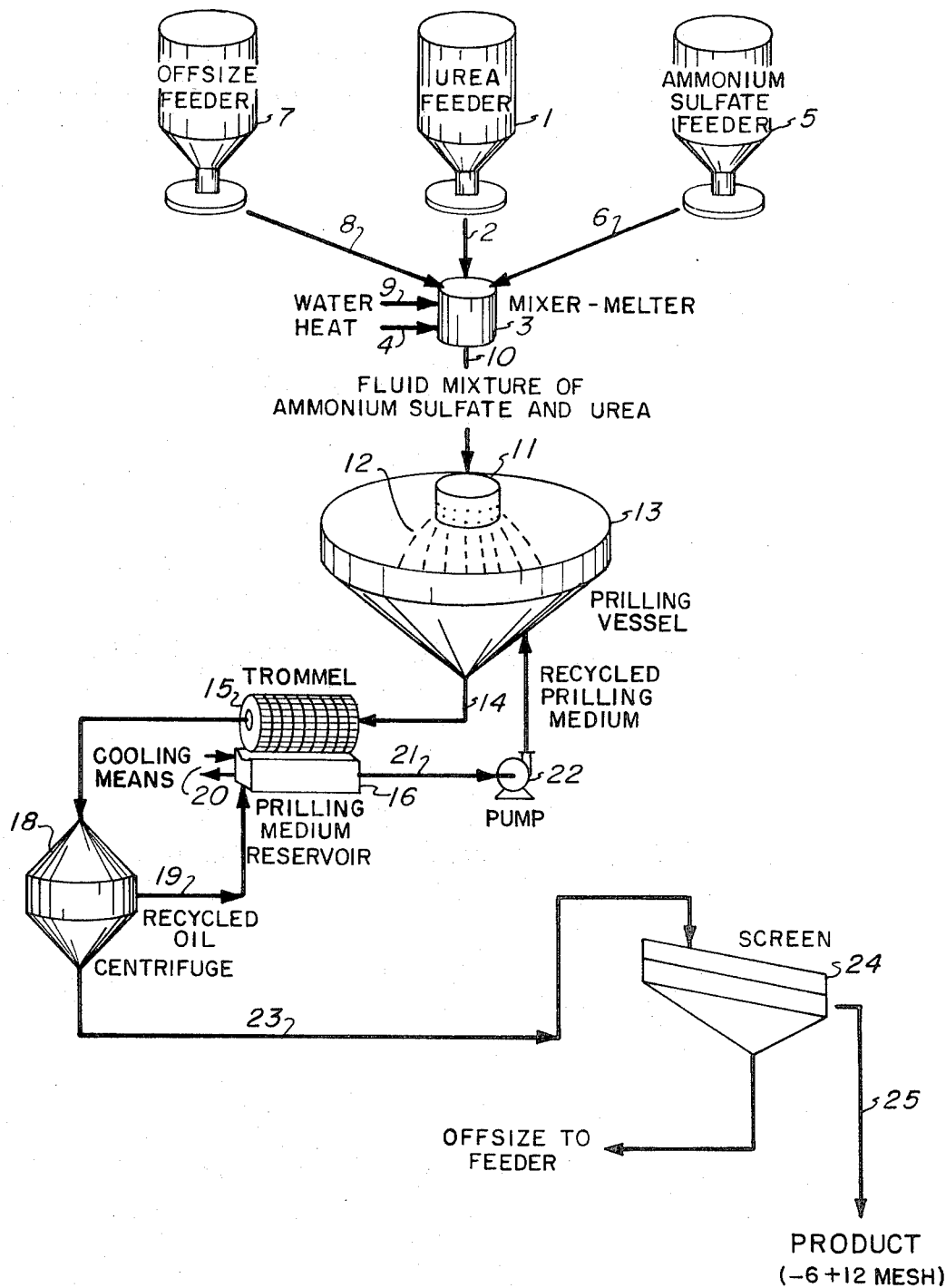
FIG. 2 is a flowsheet generally illustrating the principles of my new and novel process which results in the unique urea - ammonium sulfate prills having the novel properties mentioned above. In this embodiment, oil prilling is utilized.

Referring now more particularly to FIG. 2, most of the initial work in the pilot plant was carried out with solid urea from a commerical source and a byproduct ammonium sulfate. Both raw materials, plus recycled offsize urea - ammonium sulfate, were heated in a mixer-melter to about 275° to 300° F. and the mixture of molten urea and molten and solid ammonium sulfate were granulated by oil prilling. Prills containing about 30 percent, 33 percent, and 39 percent nitrogen were produced. They contained 61 percent, 45 percent, and 26 percent ammonium sulfate, respectively, and their sulfur content was 14 percent, 10 percent, and 6 percent by weight, respectively. Detailed operating data and results are shown in Table II below.

TABLE II

Oil Prilling of Urea — Ammonium Sulfate

| Grade (anhydrous, oil-free) | 40-0-0-4S | 34-0-0-9S | | 30-0-0-13S |
|---|---|---|---|---|
| Prilling oil[a] | 3190 H | Mineral seal G | | Mineral seal G |
| Test No. UAS | 2 | 3 | 6 | 5B |
| Melter and Mixing Tank | | | | |
| Feed materials[b] | | | | |
| Solid urea | | | | |
| Rate, lb./hr.(start-finish) | 65.4–70.2 | 70.8–73.2 | 79.2–76.8 | 47.2 |
| Ammonium sulfate | | | | |
| Grade | 20.2-0-0 | 20.2-0-0 | 20.8-0-0 | 20.8-0-0 |
| H₂O (Karl Fischer), % by wt. | 0.2 | 0.2 | 0.2 | 0.2 |
| Sulfur content, % by wt. | 23.5 | 23.5 | 24.0 | 24.0 |
| Rate, lb./hr. (start-finish) | 23.9 | 59.5–59.1 | 67.2–63.0 | 78.6 |
| Recycle | | | | |
| Grade | — | — | 35.6-0-0 | — |
| H₂O (Karl Fischer), % by wt. | — | — | 0.3 | — |
| Sulfur content, % by wt. | — | — | 9.0 | — |
| Oil, % by wt. | — | — | 2.5 | — |
| Screen analysis (Tyler series), % by wt. | | | | |
| +10 mesh | — | — | 41 | — |
| −10 +12 mesh | — | — | 3 | — |
| −12 mesh | — | — | 56 | — |
| Rate, lb./hr. (start-finish) | 0 | 0 | 48.5–86.4 | 0 |
| Discharge | | | | |
| Grade | 40.2-0-0 | 37.4-0-0 | — | 30.4-0-0 |
| H₂O (Karl Fischer, % by wt. | 0.4 | 0.5 | — | 0.2 |
| Operating conditions | | | | |
| Temperature, °F. | 300 | 290 | 280 | 280 |
| Retention time, min. | 4 | 3 | 2 | 4 |
| Prilling Apparatus[c] | | | | |
| Prilling cup | | | | |
| Rotational speed, r.p.m. | 300 | 350 | 400 | 400 |
| Inlet temperature, °F. | 282 | 275 | 270 | 270 |
| Prilling vessel | | | | |
| Temperature °F. (start-finish) | 105–105 | 95–95 | 100–110 | 83–85 |
| Trommel discharge | | | | |
| Screen analysis (Tyler series), % by wt. | | | | |
| +6 mesh | 4 | 7 | 1 | 7 |
| −6 +10 mesh | 71 | 76 | 64 | 71 |

TABLE II

Oil Prilling of Urea — Ammonium Sulfate

| Grade (anhydrous, oil-free) | 40-0-0-4S | 34-0-0-9S | | 30-0-0-13S |
|---|---|---|---|---|
| Prilling oil[a] | 3190 H | Mineral seal G | | Mineral seal G |
| Test No. UAS | 2 | 3 | 6 | 5B |
| −10 +12 mesh | 7 | 5 | 8 | 8 |
| −12 mesh | 18 | 12 | 27 | 14 |
| Oil, % by wt. | 37 | 28 | 23 | 26 |
| Discharge rate[d] (oil-free basis), lb./hr. (start-finish) | 89.3–94.1 | 130.3–132.3 | 194.9–226.2 | 125.8 |
| Prilled Product (−6 +12 mesh)[e] | | | | |
| Composition, % by wt. | | | | |
| Total N | 39.0 | 35.5 | 33.7 | 30.2 |
| NH$_3$-N | 5.0 | 9.4 | 9.1 | 12.7 |
| Total S | 6.2 | 10.8 | 10.4 | 14.7 |
| Bisulfate-S | 0 | 0.05 | 0.01 | 0.01 |
| H$_2$O (Karl Fischer) | 0.2 | 0.4 | 0.3 | 0.2 |
| Oil | 1.6 | 2.3 | 2.0 | 1.4 |
| % of prills as ammonium sulfate | 26 | 46 | 45 | 61 |
| Bulk density, lb./cu. ft. | 50 | 51 | 51 | 56 |
| Apparent density, g./ml. | 1.40 | 1.51 | 1.48 | 1.58 |

[a] 3190 H oil contained 1/2% lauric acid.
[b] Solid urea (analysis, % by wt.: total N, 46.3; H$_2$O, 0.2, ammonium sulfate, and recycle fed to mixer-melter.
The urea was air prilled and unconditioned commercial grade.
Ammonium sulfate was a byproduct.
[c] The prilling vessel was 10 inches in diameter with a 1-foot-high cylinder mounted on top of an 18-inch-high cone with 45° sides.
[d] Determined from solid urea, ammonium sulfate, and recycle fed to melter.
[e] Products centrifuged at forces of 350, 350, 800, and 600 G, respectively.

In the process solid urea was fed from metering feeder 1 via line 2 to mixer-melter vessel 3 which was equipped with a suitable agitator (not shown) for mixing and a suitable heat source 4 to provide sufficient heat to the process to give a fluid mixture. Solid ammonium sulfate from metering feeder 5 was fed via line 6 into mixer-melter vessel 3 along with recycled oversize and fines, called offsize, from metering feeder 7 via line 8. To simulate use of commerical urea solution of 99-99.8 percent concentration, water from a metering source not shown was fed via line 9 into the mixer-melter vessel 3. The urea-ammonium sulfate mixture from mixer-melter vessel 3 flowed via line 10 to prilling cup 11. The prilling cup contained small holes and was rotated by a means not shown. As the molten urea and molten and solid ammonium sulfate mixture flowed through the holes in the prilling cup, small droplets were formed which were cooled in liquid medium 12 contained in prilling vessel 13. The cooled droplets of urea - ammonium sulfate, hereafter called prills, and a portion of the liquid medium flowed from prilling vessel 13 via line 14 to trommel 15. Trommel 15 was a device to provide initial separation of prills from the liquid medium and in this case was a cylindrical shaped rotating screen; the excess liquid medium flowed through this rotating screen into liquid medium reservoir 16. The prills and remaining liquid medium flowed via line 17 into centrifuge 18 where most of the remaining liquid medium was separated from the urea - ammonium sulfate prills. The liquid medium separated in centrifuge 18 flowed via line 19 to liquid medium reservoir 16 which contained suitable cooling means 20 to remove the heat absorbed from the prills by the liquid medium. The cooled liquid medium from liquid medium reservoir 16 then flowed via line 21 through pump 22 back into prilling vessel 13 to cool other droplets of molten urea - ammonium sulfate. The prills from centrifuge 18 flowed via line 23 into screening device 24 where the prills were separated into onsize (product, oversize, and fines). The offsize was returned periodically to metering feeder 7 for reprocessing. The product-sized material from screening device 24 flowed via line 25 to a product storage pile (not shown). Liquid medium replacing that lost with the product could be added to reservoir 16 or to prilling vessel 13.

Preliminary tests indicate that the ranges of operating conditions are as follows:

| Variables | Limits | Preferred |
|---|---|---|
| Amount ammonium sulfate in urea-ammonium sulfate mixture, % by wt | 15[1]–70 | 20–60 |
| Temperature of urea-ammonium sulfate mixture prior to prilling, °F | 250[2]–325 | 275–300 |
| Time urea-ammonium sulfate mixture remains at prilling temperature, min | 0.1–10 | 1–5 |
| Temperature of prilling medium, °F | 32–200 | 75–125 |

[1] Less than 15% ammonium sulfate does not meet a prime object of this invention, to wit, an economically attractive outlet for over-abundant supply of byproduct. Also, lesser amounts do not yield sufficient sulfur values for the growing plant in areas deficient therein.
[2] Data indicate that the mixture began to melt at about 250° F. but the melt was not fluid enough to prill at 250° F.

Urea may be supplied as either a solid or as a concentrated urea solution. Also, the ammonium sulfate may be added as a solid or as a solution. Sufficient heat must be provided to the process to (1) heat the constituents to the prilling temperature, (2) melt the urea (when solid urea is used) to provide a molten carrier for the solid ammonium sulfate, (3) melt the urea in the oversize and fines that are recycled to the process, and (4) melt the portion of ammonium sulfate that does melt. The raw materials and recycled material could be added to a melter, as illustrated in FIG. 2. Alternatively, the sulfate and recycle fines could be added to a concentrator producing the concentrated urea solution. Thirdly, hot urea solution, recycle fines, and preheated ammonium sulfate could be mixed in a vessel immediately ahead of the prilling step. No urea - ammonium sulfate reaction product was found in the products. In the test work thus far, I have used lightweight oils as the liquid prilling medium. However, many liquid mediums would be satisfactory.

Also the process could be used commercially by air prilling the urea - ammonium sulfate mixture in existing conventional urea plants rather than oil prilling. For this, freshly prepared urea solution (99–99.8 percent urea, 273°–300° F.) would be fed to a premixing tank where it would be combined with heated ammonium sulfate and recycled offsize material. The general flow-sheet would be similar to FIG. 2 except that the mixer-melter vessel 3 would likely not have any means of heating (item 4). Other alternate methods of providing a molten mixture are described in the preceding paragraph. No water (item 9) would be fed to the process. The ammonium sulfate fed to the process would be preheated to a temperature high enough to give mixtures fluid enough to prill.

Although I do not have facilities for granulating by air prilling, brief exploratory tests have been made to simulate the production of one grade by this granulation method.

In the prilling tests, fluid mixtures (280°–290° F.) of unconditioned urea and byproduct ammonium sulfate[1] ([1] 99 percent -35 mesh.) were poured through a screen which was shaken by hand the the resultant droplets allowed to fall 70 feet through air. Prilling was accomplished by holding the screens outside an upper window of a tall building and allowing droplets to fall on a sheet of plastic on the ground. The urea and ammonium sulfate was proportioned to give mixtures of calculated 34-0-0-11S grade (47 percent ammonium sulfate and 53 percent urea); however, the ammonium sulfate settled very rapidly and even with good mixing some segregation evidently occurred since the prills recovered contained 37 percent nitrogen (calculated to be composed of about 64 percent urea). The very small amount of water required to simulate use of 99.5 percent urea solution was not added.

In an initial test, the air temperature was about 90° F. and no prills were formed. Instead the droplets spattered on hitting the ground indicating that more height, cooler air, a countercurrent flow of air, or any desirable combination of these items would be required for satisfactory granulation by air prilling. In a latter test, made when the air temperature was only about 20° F., spattering still occurred when some of the droplets hit the ground but some well-shaped prills formed also. The prills were quite hard[2] ([2] 3½ pounds pressure was required to break prills −7 +8 mesh size.) and of the same strength as those made by prilling in oil. It was not possible in these exploratory tests, however, to determine the size distribution of prills that might be obtained by this method, since a large proportion of the droplets did not form prills due to the relatively short prilling height and some of the prills formed were covered by the spattering. The prills collected, however, were principally in the 6- to 12-mesh size range. The results are considered promising in regard to the possibility of producing urea - ammonium sulfate in commerical air-prilling equipment such as normally is employed for urea.

Urea - ammonium sulfate can also be produced in a granular form by feeding concentrated solutions of urea and ammonium sulfate to any number of typical devices, such as, for example, rotating pan granulator, rotary drum-type granulator, Spherodizer, cooled drum, belt flaker, or pugmill.

Urea - ammonium sulfate was produced in our pilot-plant granulators by spraying a concentrated solution of urea (99.7 percent) onto a bed of cascading, recycled fines and adding crystalline ammonium sulfate. A flowsheet of the process with the pan granulator is given as FIG. 3. In one example, byproduct ammonium sulfate was added to the stream of recycle fed to the pan granulator to supply about 28 percent of the product nitrogen. Product analysis was about 37 percent N and about 9 percent S. Production rate was about 1000 pounds per hour. Some of the operating results are given in Table III below.

TABLE III

| Pan Granulation of Urea — Ammonium Sulfate | | | |
|---|---|---|---|
| Product grade | 35–0–0 | 40–0–0 | 40–0–0 |
| Production rate, tons/hr. | 0.5 | 0.5 | 0.5 |
| Urea solutions | | | |
| Feed rate, lb./hr. | 540 | 760 | 780 |
| Concentration, % | 99.7 | 99.5 | 99.5 |
| Temperature, °F. | 297 | 305 | 299 |
| Ammonium sulfate | | | |
| Feed rate, lb./hr. | 463 | 195 | 202[a] |
| Recycle | | | |
| Rate, lb./lb. product | 0.5 | 1.6 | 1.4 |
| Temperature, °F. | 106 | 122 | 130 |
| Granulator product | | | |
| Temperature, °F. | 238 | 202 | 223 |
| Screen size (Tyler), % | | | |
| +6 mesh | 21 | 1 | 12 |
| −6 +10 mesh | 64 | 77 | 82 |
| −10 mesh | 15 | 22 | 6 |

[a] Ammonium sulfate added to urea solution.

With 0.5 pounds of recycle per pound of product, about 65 percent of the granulator product was onsize and about 20 percent was oversize. Granulator product temperature was 238° F.

In two other examples in which the product contained 40 percent N and 5 percent S crystalline ammonium sulfate, a byproduct from coke-oven processes in steel mills, represented 20 percent of the feed and was either added to the stream of recycled, undersize material or was incorporated in the concentrated urea solution fed through spray nozzles into the pan granulator. A recirculation ratio of about 1.5 pounds per pound of product resulted in good granulation.

The products made in these tests were tested physically in comparison with straight urea products of commerical producers. Results indicate that the pilot-plant products containing ammonium sulfate has substantially greater strength.

Figure 3:
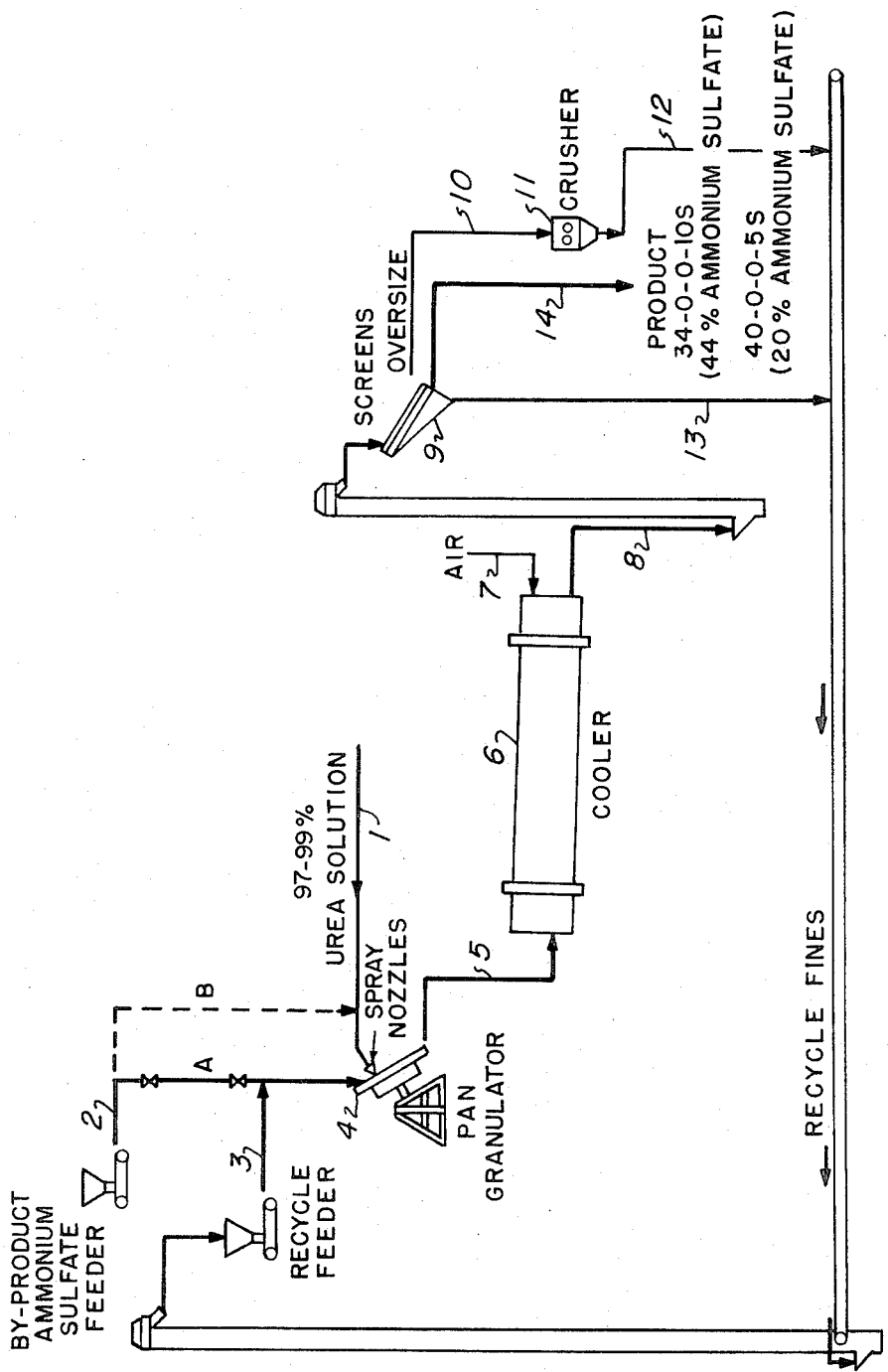
FIG. 3 is a flowsheet generally illustrating the principles of my new and novel process which result in the unique urea - ammonium sulfate prills having the novel properties mentioned above. In this embodiment, a pan granulation scheme is employed.

Referring now more specifically to FIG. 3, there is shown a flow-sheet generally illustrating the new and novel process using a pan-type granulator. Streams of concentrated urea solution 1 (produced in equipment not shown but well known to those skilled in the art) and ammonium sulfate particles 2 are continuously introduced with a recirculating load of undersize product particles 3 into pan granulator 4, which imparts a rolling and classifying action to the granules being formed. The stream of ammonium sulfate 2 can be introduced by route A to be mixed with the recycled undersize stream 3 or by route B to be mixed with the concentrated urea solution 1. Granular discharge stream 5 is withdrawn and fed to cooler 6, typically a rotating kiln-type cooler, where the hot granules are contacted with air stream 7 to cool the granules, thus removing the heat imparted to the granules by the stream of urea 1. The stream of cooled granules 8 is then passed to the classifier 9, typically a set of vibrating screens which separates the stream of granules into an oversize fraction, a product fraction, and an undersize fraction. The stream of oversize granules 10 is fed to crusher 11; the crushed oversize material 12 is combined with the undersize stream 13, and the resulting stream 3 is recycled to granulator 4. The product-size stream 14 is withdrawn as product.

Granulation in a Spherodizer pugmill, drum granulator, or cooled drum or belt flaker can be carried out in a similar manner by merely substituting the desired type of granulator in place of pan granulator 4, as shown in FIG. 3.

While I have shown and described particular embodiments of my invention, modifications and variations thereof will occur to those skilled in the art. I wish it to be understood, therefore, that the appended claims are intended to cover such modifications and variations which are within the true scope and spirit of my invention.

What I claim as new and desire to secure by letters patent of the United States is:

1. A process for the production of strong granules of high analysis urea-ammonium sulfate of easily predetermined closely controlled particle size range eminently suitable as fertilizer materials wherein said ammonium sulfate is evidenced as discrete particles thereof embedded in the matrix of urea, which process comprises the steps of:

1. maintaining in a horizontally inclined rotary pan granulator a bed of fines recycled from later mentioned sizing step in continuous and alternately rising and cascading motion;
   2. combining and intimately mixing a stream of particulate solid ammonium sulfate with a stream of concentrated urea melt in a mixing device wherein the temperature in said mixing device is maintained in the range from about 270° to about 325°F and the residence time of the material therein is maintained in the range from about 0.1 minutes to about 10 minutes, said concentrated urea melt containing in the range from about 99 to about 99.8 percent urea by weight and that the feed material constituents are in the range from about 15 to about 70 percent by weight as ammonium sulfate;
   3. removing a portion of the resulting free flowing mixture of molten melt of urea and substantially particulate ammonium sulfate from said mixing device and spraying same onto said bed of fines maintained in said pan granulator;
   4. maintaining the temperature of said bed of fines in said pan granulator in the range of about 190° to about 250°F;
   5. discharging continuously over the lower rim of said pan granulator the resulting solid urea-ammonium sulfate granules; and
   6. cooling and sizing said withdrawn material and returning the undersize and crushed oversize to the upper rim of said pan granulator and withdrawing the onsize material as product.

* * * * *